(12) United States Patent
Sölve et al.

(10) Patent No.: US 7,536,181 B2
(45) Date of Patent: *May 19, 2009

(54) PLATFORM SYSTEM FOR MOBILE TERMINALS

(75) Inventors: Torbjörn Sölve, Malmö (SE); Sebastian Weber, Malmö (SE); Johan Svenér, Malmö (SE); Bernd Möller, Dalby (SE); Bernard Smeets, Dalby (SE); Matthias Esswein, Kalchreuth (DE); Michael Bock, Georgensgmünd (DE); Elmar Kirchner, Nürnberg (DE); Jan Lind, Bjärred (SE); Rikard Dahlman, Klagshamn (SE); Björn Bjäre, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1191 days.

This patent is subject to a terminal disclaimer.

(21) Appl. No.: 10/359,835

(22) Filed: Feb. 7, 2003

(65) Prior Publication Data

US 2003/0224769 A1 Dec. 4, 2003

Related U.S. Application Data

(60) Provisional application No. 60/412,756, filed on Sep. 23, 2002, provisional application No. 60/412,763, filed on Sep. 23, 2002, provisional application No. 60/412,875, filed on Sep. 23, 2002, provisional application No. 60/357,366, filed on Feb. 15, 2002, provisional application No. 60/357,291, filed on Feb. 15, 2002.

(51) Int. Cl.
*H04Q 7/20* (2006.01)

(52) U.S. Cl. ............... 455/419; 455/418; 455/414.1

(58) Field of Classification Search ............... 455/41, 455/4.1, 466, 418, 424, 556.1, 557, 419, 455/414.1; 709/218.1, 223, 335; 370/254, 370/460

See application file for complete search history.

(56) References Cited

U.S. PATENT DOCUMENTS 3,831,148 A 8/1974 Greenwald et al.

(Continued)

FOREIGN PATENT DOCUMENTS

EP 0902596 A2 3/1999

(Continued)

OTHER PUBLICATIONS

Titos Saridakis, "Mapping requirements to Architecture: an Experience Report from the VIVIAN project", in Proceedings of the 14th International Conference on Software and Systems Engineering and their Applications, Dec. 2001.

(Continued)

*Primary Examiner*—Charles N Appiah
*Assistant Examiner*—Joy K Contee
(74) *Attorney, Agent, or Firm*—Michael Cameron

(57) ABSTRACT

A platform system for a mobile terminal for a wireless telecommunications system. The platform system comprises a mobile terminal platform assembly including a software services component having a plurality functional software units, a hardware component having a plurality of hardware units associated with and controlled by the plurality of functional software units, and an interface component having at least one interface for providing access to the mobile terminal platform assembly. The platform system further includes application software loaded, installed and run in said mobile terminal platform assembly via the at least one interface of the interface component. The mobile terminal platform assembly is adapted to be manufactured as a unit and transferred to a user who then loads, installs and runs the application software in the assembly to provide the platform system.

23 Claims, 4 Drawing Sheets

U.S. PATENT DOCUMENTS

| | | | |
|---|---|---|---|
| 5,689,565 | A | 11/1997 | Spies et al. |
| 5,771,240 | A | 6/1998 | Tobin et al. |
| 5,937,366 | A | 8/1999 | Zhytniewski et al. |
| 6,002,869 | A | 12/1999 | Hinckley |
| 6,044,408 | A | 3/2000 | Engstrom et al. |
| 6,049,896 | A | 4/2000 | Frank et al. |
| 6,052,524 | A | 4/2000 | Pauna |
| 6,061,709 | A | 5/2000 | Bronte |
| 6,105,154 | A | 8/2000 | Wang et al. |
| 6,112,312 | A | 8/2000 | Parker et al. |
| 6,137,802 | A | 10/2000 | Jones et al. |
| 6,269,396 | B1 | 7/2001 | Shah et al. ................ 709/223 |
| 6,279,124 | B1 | 8/2001 | Brouwer et al. |
| 6,317,659 | B1 | 11/2001 | Lindsley et al. |
| 6,353,897 | B1 | 3/2002 | Nock et al. |
| 6,389,491 | B1 | 5/2002 | Jacobson et al. |
| 6,600,917 | B1* | 7/2003 | Maupin ................ 455/414.1 |
| 6,908,389 | B1* | 6/2005 | Puskala ................ 463/40 |
| 6,918,108 | B2* | 7/2005 | Rajaram ................ 717/126 |
| 2001/0015654 | A1 | 8/2001 | Habersetzer et al. |
| 2002/0029378 | A1 | 3/2002 | Larsson |
| 2002/0069065 | A1 | 6/2002 | Schmid et al. ............ 704/270 |
| 2002/0069263 | A1* | 6/2002 | Sears et al. ................ 709/218 |
| 2002/0098855 | A1* | 7/2002 | Hartmaier et al. ........... 455/466 |
| 2003/0181193 | A1* | 9/2003 | Wilhelmsson et al. ........ 455/403 |
| 2003/0182347 | A1* | 9/2003 | Dehlinger ..................... 709/1 |

FOREIGN PATENT DOCUMENTS

| | | |
|---|---|---|
| EP | 1074911 A2 | 2/2001 |
| EP | 1 136 912 | 9/2001 |
| EP | 1 136 912 A2 | 9/2001 |
| WO | WO 97/16938 | 5/1997 |
| WO | WO 98/19239 | 5/1998 |
| WO | WO 99/49394 | 9/1999 |
| WO | WO 00/08611 | 2/2000 |
| WO | WO 00/69084 | 11/2000 |
| WO | WO 00/72586 A2 | 11/2000 |
| WO | WO 01/14960 A2 | 3/2001 |
| WO | WO 01/41393 A2 | 6/2001 |
| WO | WO 01/50282 A1 | 7/2001 |
| WO | WO 01/51940 A1 | 7/2001 |
| WO | WO 01/88707 A2 | 11/2001 |
| WO | WO 02/27565 | 4/2002 |
| WO | WO 02/27565 A1 | 4/2002 |
| WO | WO 02/29824 | 4/2002 |
| WO | WO 02/29824 A2 | 4/2002 |
| WO | WO 02/33879 A2 | 4/2002 |
| WO | WO 02/35351 A1 | 5/2002 |
| WO | WO 02/054094 | 7/2002 |
| WO | WO 02/054094 A1 | 7/2002 |

OTHER PUBLICATIONS

Kimmo Raatikainen, "Functionality Needed in Middleware for Future Mobile Computing Platforms", in Middleware for Mobile Computing Workshop held at IFIP/ACM Middleware Conference Heidelberg, Germany, 2001, no month listed.

Manuel Rodriguez-Martinez et al., "Automatic Deployment of Application-Specific Metadata and Code in MOCHA", Lecture Notes in Computer Science, Mar. 31, 2000 (pp. 69-85).

N.J. Drew et al., "Reconfigurable Mobile Communications: Compelling Needs and Technologies to Support Reconfigurable Terminals", IEEE International Symposium on Personal, Indoor and Mobile Radio Communications, PIMRC. Wireless: Merging onto the Information Superhighway, vol. 1, Sep. 18, 2000 (pp. 484-489).

Aspects & Crosscutting in Layered Middleware Systems by Lodewiik M.J. Bergmans et al.; Trese Group-Center for Telematics and Information Technology (CTIT); pp. 1-3, no date listed.

Supporting the Design of Adaptable Operating Systems Using Aspect-Oriented Frameworks by Paniti Netinant et al.; International Conference on Parallel and Distributed Processing Techniques and Applications (PDPTA 2000); Las Vegas, Nevada; Jun. 26-29, 2000; 7 pages, no date listed.

U.S. Appl. No. 10/359,911.
U.S. Appl. No. 10/359,772.
U.S. Appl. No. 10/666,699.
U.S. Appl. No. 10/664,618.
U.S. Appl. No. 10/665,834.

A Layered Approach to Building Open Aspect-Oriented Systems by Paniti netinant et al.; Communications of the AC; Oct. 2001; vol. 44, No. 10; pp. 83-85.

Aspect-Oriented Programming by Silvia Breu; pp. 1-22.

Draft: Aspect-Design in the Building-Block Method by Jurgen K. Muller; Philips Research Laboratories: International Workshop on Aspect-Oriented Programming at ECOOP, 1992; 3 Pages, no month listed.

A Version Model for Aspect Dependency Management by Elke Pulvermuller et al.; J. Bosh (Ed.): GCSE 2001, LNCS 2186, Springer-Verlag Berlin Heidelberg 2001, pp. 70-79, no month listed.

Can AOP Support Extensibility in Client-Serer Architectures? by Yvonne Coady et al.; European Conference on Object-Oriented Programming (ECOOP); Aspect-Oriented Workshop, Jun. 2001; pp. 1-4.

Mapping Requirements to Architecture: an Experience Report from the VIVIAN Project by Titos Saridakis; Proceedings of the 14th International Conference on Software and Systems Engineering and their Applications, Dec. 2001; pp. 1-6.

Functionality Needed in Middleware for Future Mobile Computing Platforms by Kimmo Raatikainen; Middleware for Mobile Computing Workshop held at IFIP/ACM Middleware Conference, Heidelberg, Germany, 2001; 10 pages, no month listed.

Design and Implementation of Java Application Environment and Software Platform for Mobile Phones, by Kazutoshi Usui, Hiroyuki Tomimori, Junji Takagi, Tomohisa Tanaka and Yukikazu Nakamoto; XP-001092568; Special Issue on IMT2000 Mobile Communication System; Oct. 2001; pp. 379-383.

Container-Managed Messaging: An Architecture for Integrating Java Components and Message-Oriented Applications by Ignacio Silva-Lepe, Christopher Codella, Peter Niblett, Donald Ferguson, Proceedings of the 37th International Conference on Technology of Object-Oriented Languages and Systems (Tools-Pacific 2000), Sydney, NSW, Australia, Nov. 20-23, 2000; pp. 228-241.

K. Moessner, et al., "Terminal Reconfigureability-The Optima Framework" 3G Mobile Communication Technologies, No. 477, XP002266662, Mar. 26-28, 2001, (pp. 241-246).

K. Moessner, et al., "Terminal Reconfigureability-The Software Download Aspect", 3G Mobile Communication Technologies, Conference Publication, No. 471, XP002266663, (pp. 326-330), no date listed.

U.S. Appl. No. 10/606,684, Bernd Möller et al.

Don Batory et al., "The Design and Implementation of Hierarchical Software Systems with Reusable Components" ACM Transactions on Software Engineering and Methodology, Association for Computing Machinery, New York, US, vol. 1, No. 4, Oct. 1, 1992, pp. 355-398.

Gabriele Goldacker et al., "Broadband-ISDN standardization—State of the art", Computer Standards and Interfaces, Elsevier Sequoia. Lausanne, CH, vol. 17, No. 1, 1995, pp. 55-62, no month listed.

U.S. Appl. No. 10/606,684.

* cited by examiner

PLATFORM SYSTEM FOR MOBILE TERMINALS

This application claims the benefit of U.S. Provisional Patent Application Serial Nos. 60/357,366 filed on Feb. 15, 2002, 60/357,291 filed on Feb. 15, 2002, 60/412,756 filed on Sep. 23, 2002, 60/412,763 filed on Sep. 23, 2002, and 60/412,875 filed on Sep. 23, 2002

BACKGROUND OF THE INVENTION

1. Technical Field of the Invention

The present invention relates generally to the field of wireless telecommunications; and, more particularly, to a platform system for a mobile terminal for a wireless telecommunications system.

2. Description of Related Art

Since cellular telecommunications systems were first introduced in the 1980s, mobile terminals (Mobile Stations) utilized in the systems have become increasingly more complex. Initially, mobile terminals were designed primarily to provide voice telephony services; i.e., to receive and transmit voice communications. In later years, mobile terminals were developed that also included the ability to transfer user data not related to that of a voice telephone call. Such user data included, for example, data to be transferred over a dial-up networking connection initiated via a personal computer (PC).

Currently, so-called "third generation" (3G) systems are being developed for future cellular telecommunications systems. 3G systems will combine high-speed Internet access with traditional voice communication, and will provide a user with access to Internet browsing, streaming audio/video, positioning, video conferencing and many other capabilities in addition to voice communication.

The Third Generation Partnership Project (3GPP) was established to ensure compatibility among the several 3G systems that are being developed around the world. The Universal Mobile Telephone System (UMTS) is being developed by 3GPP to provide a 3G system that includes terrestrial and satellite systems capable of delivering voice, data and multimedia anywhere in the world.

The drastically increased functionality that is being included in cellular telecommunications systems via the 3GPP standardization has placed substantial demands on the developers of mobile terminals to be used in the systems. This demand is exacerbated by the fact that a mobile terminal is a "resource scarce" environment that is limited in size, memory and power.

Traditionally, mobile terminal manufacturers have designed, fabricated and marketed substantially complete mobile terminal systems that include all the hardware and software needed for basic terminal operation as well as the hardware and software needed to provide the features and capabilities desired by the manufacturer or a particular user based on their perception of market needs. Such an approach does not provide the flexibility to quickly adapt to rapid changes in market demands or to satisfy the diverse requirements of multiple users.

There is, accordingly, a need for a system for mobile terminals for 3G and other wireless telecommunications systems that permits multiple users to execute standardized applications without it being necessary to redesign the mobile terminal system for each user.

SUMMARY OF THE INVENTION

The present invention provides a platform system for a mobile terminal for a wireless telecommunications system that provides a consistent environment to permit users to execute standardized applications without it being necessary to redesign the platform system for each user.

A platform system for a mobile terminal for a wireless telecommunications system according to the present invention comprises a mobile terminal platform assembly, the mobile terminal platform assembly including a software services component having a plurality of functional software units, a hardware component having a plurality of hardware units associated with and controlled by the plurality of functional software units, and an interface component having at least one interface for providing access to the mobile terminal platform assembly; and application software loaded, installed and run in the mobile terminal platform assembly via the at least one interface in the interface component (the term "loaded" as used herein is intended to include any mechanism by which the application software can be combined with the software of the mobile terminal platform assembly via the interface including, for example, downloading from the Internet or installing a hardware chip).

The present invention recognizes that by combining a plurality of functionally complementary units of software and hardware into an assembly that includes an interface component for providing access to the software, a mobile terminal platform assembly can be provided which can be marketed to a plurality of users (the term "user" as used herein includes manufacturers, end users or other customers or users). The users can then load, install and run their own application software in the assembly to provide a complete platform system for a mobile terminal. With the present invention, the mobile terminal platform assembly and the application software may be developed separately and then later combined to provide a complete platform system.

Further advantages and specific details of the present invention will become apparent hereinafter from the detailed description given below in conjunction with the following drawings.

DETAILED DESCRIPTION OF THE EXEMPLARY EMBODIMENTS OF THE INVENTION

Figure 1:
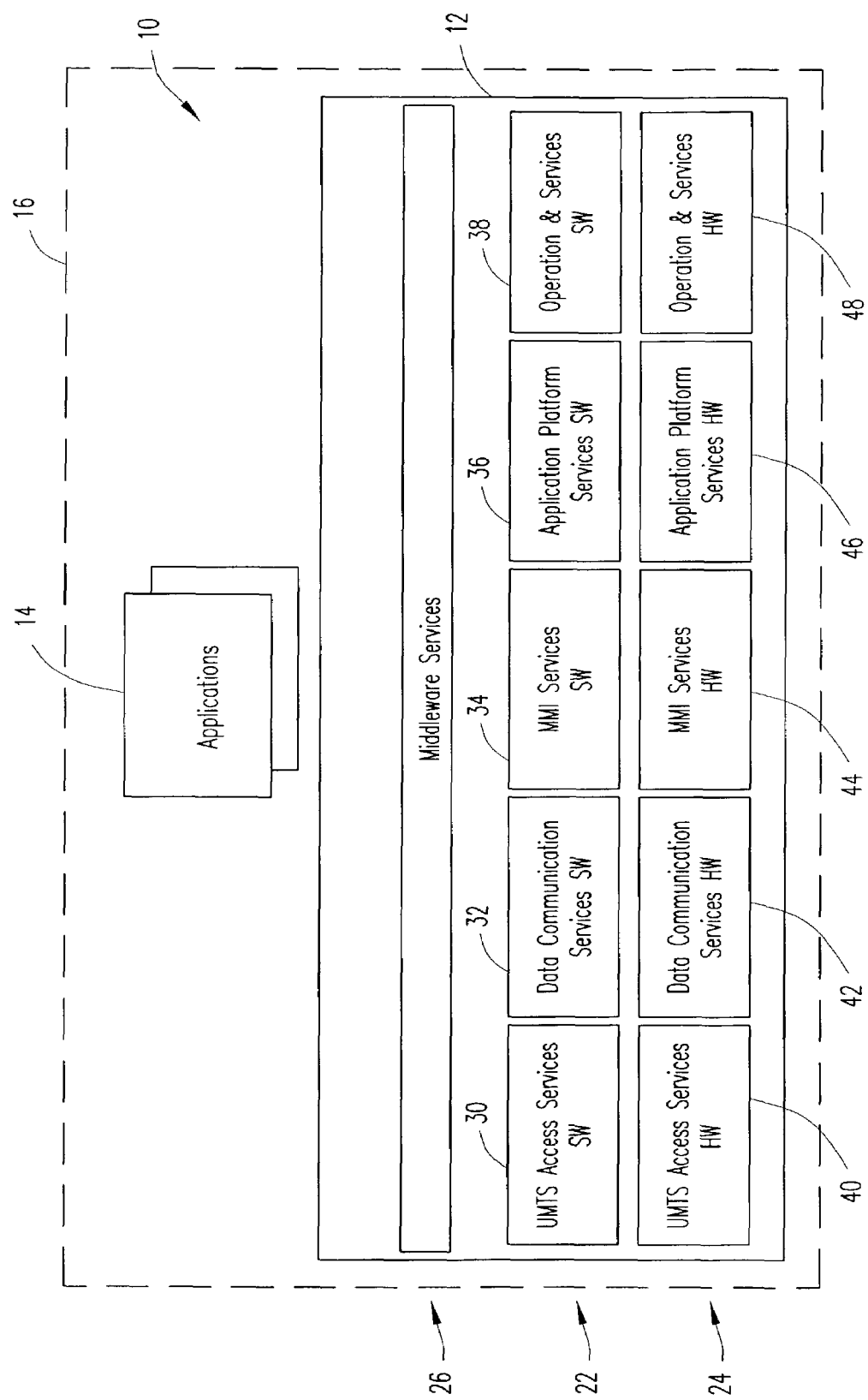
FIG. 1 is a block diagram that schematically illustrates a platform system for a mobile terminal for a wireless telecommunications system according to an exemplary embodiment of the present invention.

FIG. 1 is a block diagram that schematically illustrates a platform system for a mobile terminal for a wireless telecommunications system according to an exemplary embodiment of the present invention. The platform system is generally designated by reference number 10 and comprises a mobile terminal platform assembly 12 and one or more applications (i.e., application software) 14 that have been loaded, installed and run in the mobile terminal platform assembly. Platform system 10 is adapted to be incorporated in a mobile terminal generally designated by dotted line 16.

Mobile terminal platform assembly 12 includes a software services component 22, a hardware component 24, and an interface component 26.

Software services component 22 comprises a plurality of well-structured functional software units for providing services that are offered to users via the interface component 26. In the exemplary embodiment illustrated in FIG. 1, the plurality of software units comprise a plurality of vertically-oriented functional software stacks including a UMTS access services software stack 30, a data communications services software stack 32, an MMI (Man-Machine Interface) services software stack 34, an application platform services software stack 36 and an operation and services software stack 38

The hardware component 24 comprises a set of hardware units that are associated with and controlled by their respective functional software stacks. In the exemplary embodiment illustrated in FIG. 1, the hardware units include UMTS access services hardware 40, data communications services hardware 42, MMI services hardware 44, application platform services hardware 46 and operation and services hardware 48.

Interface component 26 preferably comprises a middleware services layer that includes one or more application interface (API) options for development of specific user applications. These APIs may include standardized (non-native) interfaces, de facto standard interfaces and/or open native interfaces. For example, a standardized interface might include the J2ME (JAVA 2 Micro Edition) environment according to MIDP/CLDC (Mobile Information Device Profile/Connected Limited Device Configuration). As will be described hereinafter, the middleware services layer also functions to isolate the assembly from user applications via the one or more interfaces.

Mobile terminal platform assembly 12 of platform system 10 is adapted to be designed, implemented (assembled) and tested as a complete, enclosed unit separate from the application software 14 (the term "application software" as used herein can be any software that provides the functionality that users may wish to have available). Users can, accordingly, develop or otherwise acquire their own application software and add that software to the mobile terminal platform assembly 12 at a later time in order to complete the platform system 10. With the present invention, accordingly, mobile terminal platform assembly 12 can be sold or otherwise transferred to a plurality of different users each of which can complete platform system 10 by loading, installing and running their own application software in the assembly in order to satisfy their own particular requirements for the platform system.

Software stacks 30-38 of software services component 22 and their associated hardware units 40-48 define functional stacks that are structured into manageable pieces (software modules and hardware blocks) having clearly defined functionality and interfaces. A user of mobile terminal platform assembly 12 does not have to be concerned about the internal details of the functional stacks, but can access the stacks via the middleware services layer 26 to obtain the functionality required to design desired application software.

Figure 2:
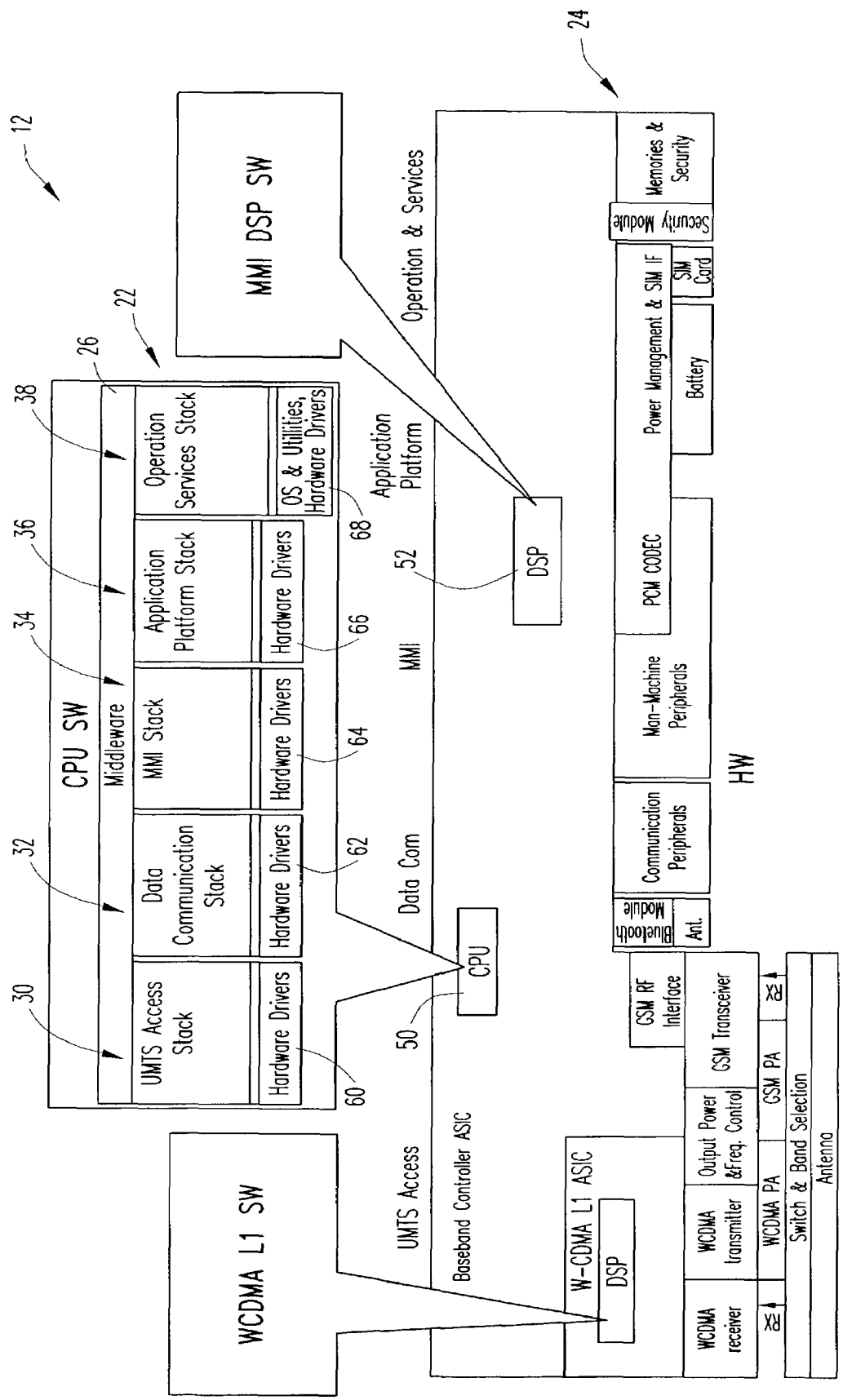
FIG. 2 is a block diagram that schematically illustrates a deployment view of the mobile terminal platform assembly of the platform system of FIG. 1 according to another exemplary embodiment of the present invention.

FIG. 2 is a block diagram that schematically illustrates a deployment view of mobile terminal platform assembly 12 of FIG. 1 according to an exemplary embodiment of the present invention. It should be clearly understood, however, that mobile terminal platform assembly 12 could comprise any desired number of functional units arranged in numerous different ways and providing any desired functions, and it is not intended to limit the invention to the illustrated embodiment.

As illustrated in FIG. 2, mobile terminal platform assembly 12 is controlled via software executing in a main CPU 50. The main CPU may comprise one or more processors such as microprocessors, micro programmable processors or DSPs (Digital Signal Processors). A DSP for the MMI services software stack 34 is illustrated at 52. The software stacks 30-38 of software component 22 each include hardware driver software 60-68 to operate the hardware units associated with each stack. As shown in FIG. 2, exemplary of the hardware units that are controlled by the functional software stacks include a receiver, a transmitter, a power and frequency controller, a GSM transceiver, a Bluetooth module, various communication and man-machine peripherals, power management and SIM interface, memories and security hardware.

Figure 3:
FIG. 3 is a block diagram that schematically illustrates the software architecture of the mobile terminal platform assembly of FIGS. 1 and 2 according to an another exemplary embodiment of the present invention.

The software incorporated in mobile terminal platform assembly 12 is preferably arranged in such a manner as to make the software organization easy to understand. Such a capability is especially important when developing or revising complex software systems. FIG. 3 is a block diagram that schematically illustrates the software architecture of mobile terminal platform assembly 12 according to an exemplary embodiment of the present invention.

As shown in FIG. 3, software services component 22, in addition to being organized into a plurality of vertical, functional software stacks as described above, is also arranged to define a plurality of horizontal layers such that the software of the middleware services layer 26 and the software of the software services component 22 together define a layered architecture, generally designated by reference number 70, in which the layers are arranged in descending order from a higher level service layer to a lower level service layer.

The software architecture according to exemplary embodiments of the present invention differ from the standard ISO/OSI (ISO Open Systems Interconnection) model in that it includes a plurality of horizontally partitioned functional software units that complement a plurality of vertically partitioned software layers. The horizontal partitioning contributes significantly to the creation of independent modular (service) components.

The highest layer of the layered architecture is the middleware services layer 26 which, as indicated above, provides one or more interfaces to the mobile terminal platform assembly 12, and also isolates the platform assembly from the applications using it. Middleware services layer 26 also provides other environmental services for the applications. The layers of the software services component 22 include an application server layer 80 to provide application services, a platform services layer 82 to provide platform specific services for applications, a platform protocol layer 84 to provide session protocols and application specific protocols, a transport layer 86 to provide audio access/control, datacom transport protocols, messaging transport protocols and the like, a data access layer 88 to provide external data IF access, structured storage services and other low level platform support services, a logical drivers layer 90 and a physical drivers layer 92 encapsulating hardware dependencies. In addition, software services component 22 includes basic system services layers 94 that provide general services that are needed by the platform assembly.

The bottom two layers 90 and 92 constitute Hardware Abstraction Layers (HAL) which isolate the dependencies between the software and the hardware. Only the physical drivers layer is concerned with the details of the hardware (i.e., in which registers in the ASIC hardware are addressed). The logical drivers layer 90 provides a logical mapping to the hardware, i.e., this layer provides a bridge between the hardware and software parts of the mobile terminal platform assembly.

The software itself is organized into a plurality of software modules, e.g. modules 102, 104, 106. In software services component 22, a single module can reside in only one vertical functional stack and in only one horizontal layer within that stack. Each layer can contain from one to many modules, and all the modules in a particular layer and in a particular stack have the same level of abstraction. Communication among the various modules is accomplished via a Software Back Plane (SwBP) 112 subject to a set of basic rules for software module-to-module access. These rules can be summarized as follows:

- A software module may invoke functionality in all layer interfaces below its own layer.
- There are no limitations for the direction of channel events or data streams. They may go in any direction.
- A software module may never invoke functionality in layer interfaces (in the SwBP) above its own layer, independent of to which module the layers belong.
- A software module may invoke functionality in the layer interface in its own layer in the same vertical stack.
- A software module may invoke functionality in a software module in the same layer in another vertical stack. (This capability is permitted to limit the number of layers in the vertical stacks.)

There is no hard coupling between the various modules and the interfaces in the SwBP. As a result, the modules and/or the implementation of the interfaces can be freely changed without any impact on the clients to the interfaces. This is an important capability as it permits individual modules to be added, removed or changed without affecting other modules in the platform assembly.

Further specific features and details of the layered architecture, including the SwBP software structure that enables the internal communication between modules within the mobile terminal platform assembly are described in commonly assigned, U.S. patent application Ser. No. filed concurrently herewith, the disclosure of which is hereby incorporated by reference.

The middleware services layer 26 provides and supports a range of different application environments for development of applications. Each application environment has its own characteristics and is defined as:

- The way applications are developed (programming language support, compilation and linkage).
- The way applications are executed (e.g., interpretation or native code execution)
- The functional services that are offered.
- Potential restrictions in use.

By providing multiple application environment alternatives, a wide range of products with varying demands such as cost, ease of use, time to market, functionality set, size, portability, etc. is facilitated. As shown in FIG. 3, such environments offered by the middleware layer may include a JAVA EXE environment domain, an Open Application Framework (OAF) domain and an open platform API (OPA) domain.

As indicated above, middleware services layer 26 also functions to encapsulate the mobile terminal platform assembly 12 and to isolate the platform assembly from the applications 14 via the interfaces provided by the middleware services layer.

Further features and details of the middleware services layer are described in commonly assigned, U.S. patent application Ser. No. filed concurrently herewith and incorporated herein by reference.

An important aspect of the platform system of the present invention is that it is scalable in the sense that it enables the configuration of services required for the development of cost and size-restricted devices. The services provided by mobile terminal platform assembly 12 are independent of the internal structure of the platform assembly and of data types. Accordingly, applications are unaffected by any internal changes in the platform assembly, as long as the functionality remains unchanged. This permits the platform assembly to be updated, improved upon or otherwise modified without affecting existing applications in any way.

As described above, UMTS will permit mobile terminals to be utilized in many applications in addition to traditional voice communications. Some of these applications, for example, electronic payment, gambling, ticketing and/or corporate access services, will require effective security mechanisms. Security mechanisms in current mobile terminal applications closely follow the approach used in the PC market in that the security software is vertically integrated with the application. Vertical software integration is not suitable for mobile terminals or other devices that are resource scarce, particularly when the mobile terminal must support a plurality of different applications requiring security mechanisms, as vertical software integration would result in a duplication of security functionality in the various applications and a waste of terminal resources.

According to a further exemplary embodiment of the present invention, mobile terminal platform assembly 12 of platform system 10 further includes a security mechanism for protecting applications that require such a capability, and, at the same, time that shares commonly used functionality among the various applications as much as possible so as to reduce requirements with respect to computing power, battery life and memory.

The security mechanism according to an exemplary embodiment of the present invention basically combines the layered, modular design principles of mobile terminal platform assembly 12 with the capabilities of a generic crypto API such as PKCS#11. The achieved architecture allows easy integration of removable and non-removable (fixed mounted) smart cards or multi-media cards (e.g., MMC or SD cards) with integrated security mechanisms.

Figure 4:
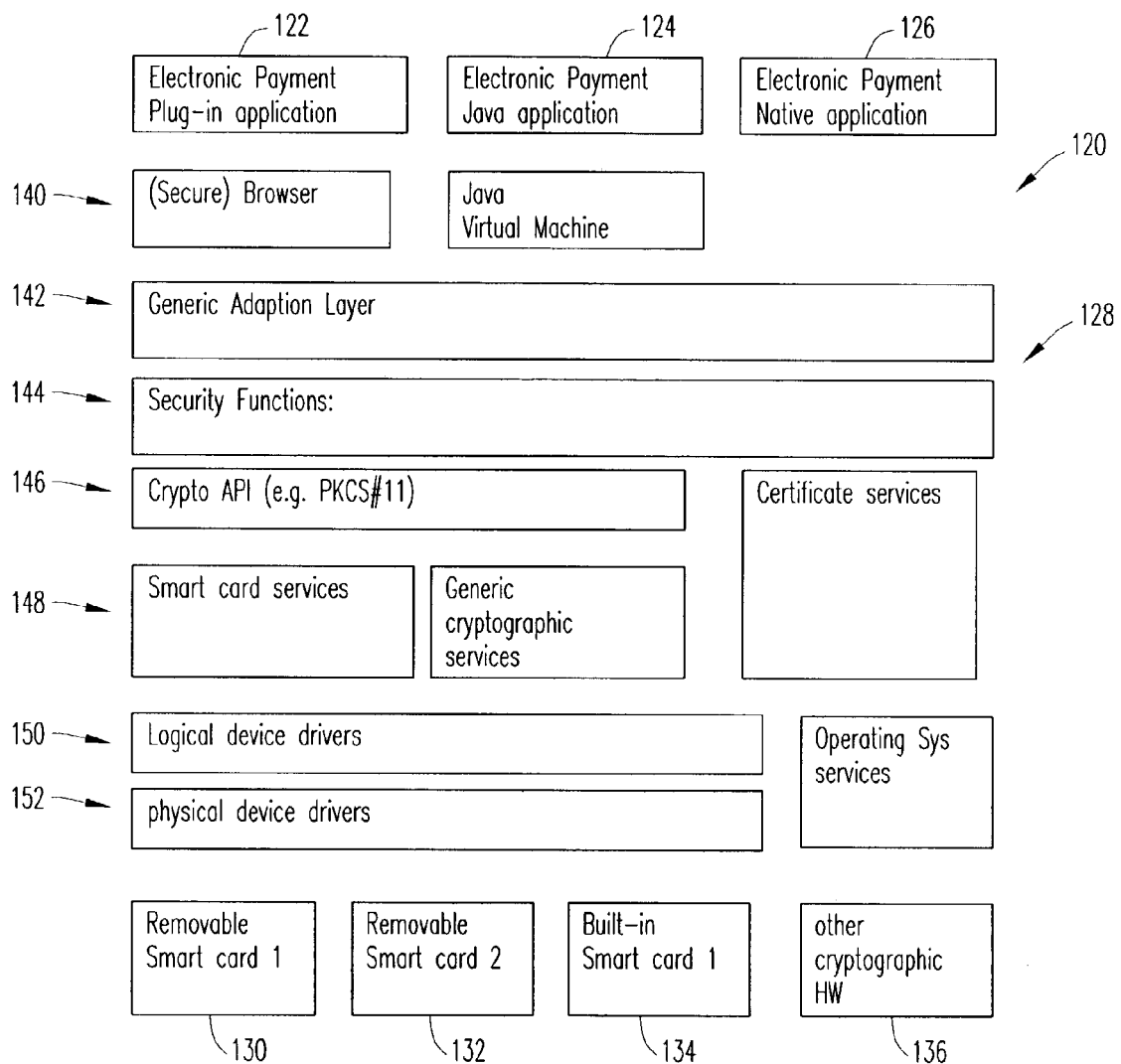
FIG. 4 is a block diagram that schematically illustrates a security mechanism that may be incorporated in the mobile terminal platform assembly of FIGS. 1 and 2 according to another exemplary embodiment of the present invention.

FIG. 4 is a block diagram that schematically illustrates a security mechanism 120 that may be incorporated into the mobile terminal platform assembly of a platform system according to an exemplary embodiment of the present invention. In the embodiment illustrated in FIG. 4, the platform system includes three customer payment applications 122, 124, 126; one using a browser and its environment, one implemented as a JAVA application, and one as a native (to the device operation environment) application. FIG. 4 also illustrates a functional stack 128 that includes both functional software components and hardware components. In particular, the hardware includes removable and fixed hardware for cryptographical services in the form of removable smart cards 130 and 132, a built-in smart card 134 and special built-in cryptographic hardware 136.

As also shown in FIG. 4, the security mechanism 120 is implemented using the layered, modular functional approach described with reference to FIG. 3 wherein the software is arranged in a plurality of layers 140-152 with each layer including one or more software modules. A layered, modular functional software architecture decreases development costs, not only during initial design and testing but also during implementation of the design, since the functionality is only implemented once. Furthermore, software memory costs are reduced and device (cost) differentiation by, for example, the addition of cryptographic hardware accelerators can be realized without affecting the application software.

Figure 5:
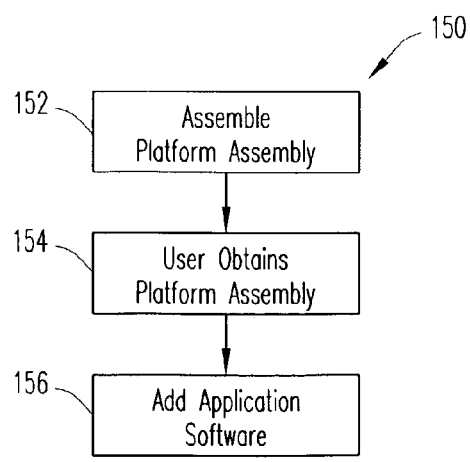
FIG. 5 is a flow chart that schematically illustrates steps of a method for providing a platform system for a mobile terminal for a wireless telecommunications system according to another exemplary embodiment of the present invention.

FIG. 5 is a flow chart that schematically illustrates steps of a method for providing a platform system for a mobile terminal for a wireless telecommunications system according to another exemplary embodiment of the present invention. The method is generally designated by reference number 150, and begins by assembling a mobile terminal platform assembly that includes a software services component, a hardware component and an interface component (step 152). After the platform assembly has been fully assembled, application software is then added to the assembly to complete the platform system (step 156). The application software can be added by a customer or other user after the platform assembly is sold or otherwise transferred to the user (step 154).

While what has been described constitutes exemplary embodiments of the present invention, it should be recognized that the invention can be varied in many ways without departing therefrom. For example, although the present invention has been described primarily as being used in a third generation cellular telecommunications system, the invention can also be used in second generation and other cellular telecommunications systems, and in other wireless telecommunications systems such as, for example, a Bluetooth system. Because the invention can be varied in numerous ways, it should be understood that the invention should be limited only insofar as is required by the scope of the following claims.

We claim:

1. A platform system for a mobile terminal for a wireless telecommunications system, comprising:
a mobile terminal platform assembly, the mobile terminal platform assembly including a software services component having a plurality functional software units, a hardware component having a plurality of hardware units associated with and controlled by the plurality of functional software units, and an interface component comprising a middleware services layer having at least one interface for providing access to the mobile terminal platform assembly; and
application software loaded, installed and run in said mobile terminal platform assembly via said at least one interface in the interface component;
wherein communication among the various plurality of functional software units is accomplished via a software backplane (SWBP), and the following rules govern access between the plurality of functional software units: a software unit module may invoke functionality in all layer interfaces below its own layer; a software unit may never invoke functionality in any layer interfaces above its own layer; and a software unit may invoke functionality in the layer interface in its own layer in a same vertical stack or in another vertical stack.

2. The platform system according to claim 1, wherein said plurality of functional software units comprise a plurality of vertical functional stacks.

3. The platform system according to claim 2, wherein each of said plurality of vertical functional stacks further includes associated hardware units of said hardware component.

4. platform system according to claim 1, wherein said middleware services layer further isolates said application software from said mobile terminal platform assembly via said at least one interface.

5. The platform system according to claim 2, wherein software of said software services component is also organized in a plurality of horizontal layers arranged in order from a higher level service layer to a lower level service layer.

6. The platform system according to claim 5, wherein said software of said software services component is further organized into a plurality of software modules.

7. The platform system according to claim 5, wherein at least one of said plurality of functional software stacks comprises a security mechanism for providing a security function for an application.

8. The platform system according to claim 1, wherein said wireless telecommunications system comprises a cellular telecommunications system.

9. The platform system according to claim 8, wherein said cellular telecommunications system comprises a third generation cellular telecommunications system.

10. A mobile terminal platform assembly for a platform system for a wireless telecommunications system, comprising:
a software services component having a plurality functional software units;
a hardware component having a plurality of hardware units associated with and controlled by the plurality of functional software units; and
an interface component comprising a middleware services layer having at least one interface for providing at least one application with access to the mobile terminal platform assembly for loading, installing and running said at least one application in said mobile terminal platform assembly;
wherein communication among the various plurality of functional software units is accomplished via a software backplane (SWBP), and the following rules govern access between the plurality of functional software units: a software unit module may invoke functionality in all layer interfaces below its own layer; a software unit may never invoke functionality in any layer interfaces above its own layer; and a software unit may invoke functionality in the layer interface in its own layer in a same vertical stack or in another vertical stack.

11. The mobile terminal platform assembly according to claim 10, wherein said plurality of functional software units comprise a plurality of vertical functional stacks.

12. The mobile terminal platform assembly according to claim 11, wherein each of said plurality of vertical functional stacks further includes associated hardware units of said hardware component.

13. The mobile terminal platform assembly according to claim 10, wherein said middleware services layer isolates said mobile terminal platform assembly from said at least one application except through said at least one interface.

14. The mobile terminal platform assembly according to claim 11, wherein software of said software services component is also organized in a plurality of horizontal layers arranged in order from a higher level service layer to a lower level service layer.

15. The mobile terminal platform assembly according to claim 14, wherein said software is further organized into a plurality of software modules.

16. The mobile terminal platform assembly according to claim 10, wherein said wireless telecommunications system comprises a cellular telecommunications system.

17. The mobile terminal platform assembly according to claim 16, wherein said cellular telecommunications system comprises a third generation cellular telecommunications system.

18. A method for providing a platform system for a mobile terminal for a wireless telecommunications system, comprising:
   assembling a mobile terminal platform assembly that includes a software services component having a plurality of functional software units, wherein communication among the various plurality of functional software units is accomplished via a software backplane (SWBP), and the following rules govern access between the plurality of functional software units: a software unit module may invoke functionality in all layer interfaces below its own layer; a software unit may never invoke functionality in any layer interfaces above its own layer; and a software unit may invoke functionality in the layer interface in its own layer in a same vertical stack or in another vertical stack; a hardware component having a plurality of hardware units controlled by the plurality of functional software units, and an interface component comprising a middleware services layer having at least one interface for providing access to the mobile terminal platform assembly; and
   thereafter adding at least one application software to said mobile terminal platform assembly via said at least one interface in said interface component.

19. The method according to claim 18, wherein said step of adding at least one application software comprises a user of said platform system adding said at least one application software to said mobile terminal platform assembly.

20. The method according to claim 19, and further including the step of transferring said mobile terminal platform assembly to said user before said step of adding said at least one application software to said mobile terminal platform assembly.

21. The method according to claim 18, wherein said step of adding at least one application software comprises loading, installing and running said at least one application software in said mobile terminal platform assembly via said at least one interface in said interface component.

22. A method for providing a platform system for a mobile terminal for a wireless telecommunications system, comprising:
   manufacturing, by a manufacturer, a mobile terminal platform assembly that includes a software services component having a plurality of functional software units, wherein communication among the various plurality of functional software units is accomplished via a software backplane (SWBP), and the following rules govern access between the plurality of functional software units: a software unit module may invoke functionality in all layer interfaces below its own layer; a software unit may never invoke functionality in any layer interfaces above its own layer; and a software unit may invoke functionality in the layer interface in its own layer in a same vertical stack or in another vertical stack; a hardware component having a plurality of hardware units controlled by the plurality of functional software units, and an interface component comprising a middleware services layer having at least one interface for providing access to the mobile terminal platform assembly;
   transferring said mobile terminal platform assembly to a user; and
   thereafter adding, by said user, at least one application software to said mobile terminal platform assembly via said at least one interface of said interface component.

23. The method according to claim 22, wherein said user develops said at least one application software before the step of adding the at least one application software to said mobile terminal platform assembly.

\* \* \* \* \*

UNITED STATES PATENT AND TRADEMARK OFFICE
CERTIFICATE OF CORRECTION

PATENT NO.         : 7,536,181 B2                                          Page 1 of 1
APPLICATION NO. : 10/359835
DATED              : May 19, 2009
INVENTOR(S)        : Solve et al.

It is certified that error appears in the above-identified patent and that said Letters Patent is hereby corrected as shown below:

In Column 1, Line 9, after "2002" insert -- . --.

In Column 3, Line 30, after "38" insert -- . --.

In Column 4, Line 49, delete "(ISO Open" insert -- "(ISO/Open --, therefor.

In Column 5, Line 62, after "execution)" insert -- . --.

In Column 6, Line 43, delete "capability," insert -- capability; --, therefor.

In Column 7, Lines 59-60, in Claim 1, delete "software backplane (SWBP)," and insert -- Software Back Plane (SwBP), --, therefor.

In Column 8, Line 7, in Claim 4, insert -- The --, before "platform".

In Column 8, Lines 43-44, in Claim 10, delete "software backplane (SWBP)," and insert -- Software Back Plane (SwBP), --, therefor.

In Column 9, Line 18, in Claim 19, delete "software backplane (SWBP)," and insert -- Software Back Plane (SwBP), --, therefor.

In Column 10, Lines 16-17, in Claim 21, delete "software backplane (SWBP)," and insert -- Software Back Plane (SwBP), --, therefor.

Signed and Sealed this

Seventeenth Day of November, 2009

David J. Kappos
*Director of the United States Patent and Trademark Office*